United States Patent Office

Re. 24,707
Reissued Sept. 29, 1959

24,707

RUMINANT FEED

Marvin B. Gillis, Glenview, Ill., assignor to International Minerals & Chemical Corporation, a corporation of New York No Drawing. Original No. 2,758,027, dated August 7, 1956, Serial No. 278,959, March 27, 1952. Application for reissue July 31, 1958, Serial No. 755,829

8 Claims. (Cl. 99—2)

Matter enclosed in heavy brackets [ ] appears in the original patent but forms no part of this reissue specification; matter printed in italics indicates the additions made by reissue.

The present invention relates to animal food compositions. More particularly, it relates to the incorporation of certain end liquors from glutamic acid production into animal food compositions.

Improved methods of beet sugar refining and the recovery of substances separable from saccharate filtrates or concentrated Steffen's filtrates and having additional commercial value, for example, as sources of glutamic acid which is used in the manufacture of monosodium glutamate, have made it desirable to determine the value of the end liquors from which the glutamic acid has been recovered. Much of the beet pulp produced in this country is combined with molasses and dried at the beet sugar factories. This dried molasses-beet pulp is known to be a valuable feed for cattle and sheep. In view of the similarity of some of the constituents of certain glutamic acid end liquors to the non-sugar fraction of beet molasses, it was thought desirable to determine whether certain end liquors from glutamic acid production are suitable as constituents for animal rations.

Glutamic acid is produced from raw materials, such as animal and vegetable proteins, concentrated Steffen's filtrates and the like, by hydrolyzing the glutamic acid mother substances therein, and recovering glutamic acid from the resulting hydrolysate by crystallization at its isoelectric point, that is, a pH of between about 2.5 and about 4.0, preferably about 3.2. The end liquor from which the glutamic acid crystals have been removed is a liquid and has an appearance somewhat similar to molasses. As used in the description and claims, the term "end liquor" refers to liquors produced by hydrolyzing glutamic acid mother substances obtained from sugar beets and from which a portion of the glutamic acid has been removed.

It is an object of the instant invention to provide an animal food composition containing end liquors from the production of glutamic acid.

It is a further object of the instant invention to provide an animal food composition containing the end liquor from the production of glutamic acid from concentrated Steffen's filtrates.

It is a further object of the instant invention to provide a betaine-containing animal food composition.

It is a further object of the instant invention to provide an animal food composition which is palatable and which is free of dust.

These and other objects of the instant invention will become more apparent upon a fuller understanding of the invention as hereafter described.

The instant invention is concerned with animal food compositions prepared by incorporating end liquors from glutamic acid production from raw materials, such as, concentrated Steffen's filtrates into animal food rations and onto roughages.

In an embodiment of the instant invention, between about one-tenth pound and about twenty-five pounds of glutamic acid end liquor is added to one hundred pounds of animal feed ration. A typical end liquor obtained from glutamic acid production, for example, from concentrated Steffen's filtrate, contains about 20% crude protein equivalent of which between about 10% and about 15% is betaine, about 18% ash, about 25% non-nitrogenous organic material, and about 36% moisture. This liquid is readily accepted by animals, and in addition to its nutritional contribution increases the palatability of the final ration and improves the physical condition of the final mixed feed. Today, solvent extracted seed meals are generally used in animal foods and impart a dry dusty consistency to the ration. In this connection the hygroscopic nature of the end liquor is an additional asset when added to the dry or dusty feeds because it increases the moisture content thereof, prevents dusting, and improves the consistency of the final feed product.

The instant product is useful for the feeding of cattle, sheep, dogs, poultry, and other animals. In the feeding of cattle and of sheep it has been discovered that the glutamic acid end liquor produced from concentrated Steffen's filtrate is substantially equal in feeding value to either cane molasses or beet molasses. The end liquor is added to the ration in amounts of between about 0.1% and about 25% by weight of the feed.

The amount of end liquor incorporated into any ration is a matter of choice and is determined by the purpose for which it is employed. For example, as a source of betaine for poultry, between about ten pounds and about forty pounds of end liquor per ton of finished ration may be employed. However, for chicks and broiler rations, it is preferable to incorporate about twenty pounds of end liquor per ton of finished feed. For cattle and sheep, between about ten pounds and about twenty-five pounds of end liquor per one hundred pounds of ration, preferably between about ten pounds and about fifteen pounds of end liquor per one hundred pounds ration are employed. It has also been discovered that when between about 10% and about 20% by weight of end liquor is added, any carotene present in the ration is stabilized, that is, the rate of oxidation of carotene is retarded.

The end liquor can be added to any type of animal food. It can be incorporated into rations of liquids or into solids or mixtures of liquids and solids. For example, end liquor is added to rations of alfalfa, corn, hay, grains, silage, beet pulps, protein meals or any other desired animal food.

When the end liquor is used in rations to improve the physical characteristics of the feed for animals, that is, to increase palatability and/or the consistency of the mixture, any quantity may be used depending upon the other ingredients involved, and their physical properties, and the physical properties of the final mixture desired. Any reasonable quantity used in the ration will not cause unfavorable results. This liquid when added to dog foods greatly improves the appeal of the final product.

The end liquor can be incorporated into feed mixtures and roughages by any conventional method used for incorporating liquids into such mixtures. The end liquor can be poured directly into a batch of animal ration, or it can become a part of a premix. In addition, almost any liquid can be injected into any type of mixer under pressure with air.

In a specific embodiment of the instant invention, a mixture of Steffen's filtrate end liquor and dried beet pulp is used as approximately one-third of the concentrate ration for fattening steers. The amount of end liquor dried on the pulp is sufficient to furnish about 22% of the total solids of the mixture. Gain in weight by the steers which received the end liquor with the beet pulp in the ration is substantially the same as the gain in weight of steers fed similar amounts of molasses and beet pulp rations. The high content of nitrogenous materials in this product is desirable when used in conjunction with beet pulp since the beet pulp itself is very low in protein.

The end liquor from which glutamic acid has been removed usually has a pH of between about 2.5 and about 4.0 [, however, if desired, the end liquor can be neutralized with caustic soda. Liquors having a pH of between about 2.5 and about 9.0 may be added to the animal ration].

As a specific example of the process, the following serves merely as illustration, and it is not intended that the scope of the invention be limited thereto.

EXAMPLE

Hereford steers weighing approximately nine hundred seventy-five pounds were fed a mixture of concentrated Steffen's filtrate end liquor mixed with beet pulp. The end liquor was mixed with beet pulp and dried with the beet pulp. About one hundred pounds of the dried pulp mixture contained the equivalent of about thirty-five pounds of the original end liquor. The end liquor had a pH of about 3.2 and analyzed approximately as follows: protein equivalent, 19.7%; non-nitrogenous organic material, 25.8%; ash, 18.3%; total solids 63.8; moisture, 36.2%; and betaine (anhydrous), 12.0%.

The average daily ration contained about 5.4 parts of the glutamic acid end liquor, 11.3 parts of ground corn, 0.9 part of soybean meal, 3.5 parts of alfalfa, 8.7 parts of corn silage and about 0.03 part of salt. The animals were allowed to consume as much of the ration as desired during the experimental period which lasted six months. The cattle consumed daily an average of about one and nine-tenths pounds of end liquor on a wet basis or one and two-tenths pounds of dry matter from the end liquor. The average daily gain in weight was about two and five-tenths pounds.

[The end liquor from wheat gluten hydrolysates from which glutamic acid has been recovered may also be incorporated into animal feed rations. This end liquor has an analysis approximately as follows: protein, 45%; sodium chloride, 10%; total solids, 55%; amino solids, 40%.]

Having thus fully described the character of the instant invention what is desired to be protected by Letters Patent is:

1. A ruminant feed composition comprising a ruminant feed ration containing between about 0.1% and about 25.0% by weight of an end liquor produced by hydrolyzing glutamic acid mother substances obtained from sugar beets and from which a portion of the glutamic acid has been removed, *said end liquor having a pH between about 2.5 and about 4.0.*

2. A cattle feed composition comprising a cattle feed ration containing between about 0.1% and about 25.0% by weight of an end liquor produced by hydrolyzing glutamic acid mother substances obtained from sugar beets and from which a portion of the glutamic acid has been removed, *said end liquor having a pH between about 2.5 and about 4.0.*

3. A feed composition as in claim 2 wherein the glutamic acid mother substance is Steffen's filtrate.

4. A feed composition as in claim 3 wherein the end liquor is present in an amount between about 10% and about 25% by weight.

5. A sheep feed composition comprising a sheep feed ration containing between about 0.1% and about 25.0% by weight of an end liquor produced by hydrolyzing glutamic acid mother substances obtained from sugar beets and from which a portion of the glutamic acid has been removed, *said end liquor having a pH between about 2.5 and about 4.0.*

6. A feed composition as in claim 5 wherein the glutamic acid mother substance is Steffen's filtrate.

7. A feed composition as in claim 6 wherein the end liquor is present in an amount between about 10% and about 25% by weight.

8. A cattle feed composition comprising a cattle feed ration containing between about 10% and about 15% by weight of Steffen's filtrate and liquor remaining after removal of a portion of the glutamic acid from Steffen's filtrate hydrolysate, *said end liquor having a pH between about 2.5 and about 4.0.*

References Cited in the file of this patent
or the original patent

UNITED STATES PATENTS

| | | |
|---|---|---|
| 2,217,711 | Shappirio | Oct. 15, 1940 |
| 2,344,229 | Block et al. | Mar. 14, 1944 |
| 2,535,117 | Bennett | Dec. 26, 1950 |
| 2,566,549 | Beckwith et al. | Sept. 4, 1951 |
| 2,589,287 | Ryan et al. | Mar. 18, 1952 |

OTHER REFERENCES

Schmidt: Chemistry of Amino Acids and Proteins (1938), Charles C. Thomas, published Springfield, Ill., pp. 242–243.